United States Patent
Vijayaraghavan et al.

(10) Patent No.: US 12,118,551 B2
(45) Date of Patent: *Oct. 15, 2024

(54) SYSTEMS AND METHODS FOR SINGLE MESSAGE TRANSACTIONS WITH BATCH SETTLEMENT

(71) Applicant: Worldpay, LLC, Symmes Township, OH (US)

(72) Inventors: Ramesh Vijayaraghavan, Mason, OH (US); Samuel Adams, Florence, KY (US)

(73) Assignee: Worldpay, LLC, Symmes Township, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/061,144

(22) Filed: Dec. 2, 2022

(65) Prior Publication Data
US 2023/0108170 A1 Apr. 6, 2023

Related U.S. Application Data

(63) Continuation of application No. 16/995,317, filed on Aug. 17, 2020, now Pat. No. 11,544,709.

(51) Int. Cl.
*G06Q 20/40* (2012.01)
*G06Q 20/34* (2012.01)

(52) U.S. Cl.
CPC ....... *G06Q 20/4012* (2013.01); *G06Q 20/341* (2013.01)

(58) Field of Classification Search
CPC ............................................ G06Q 20/00–425
See application file for complete search history.

(56) References Cited

U.S. PATENT DOCUMENTS 3,786,867 A 1/1974 Tausch et al.
8,296,235 B2 * 10/2012 Hrabosky .............. G06Q 40/00
705/41

(Continued)

FOREIGN PATENT DOCUMENTS

EP 3786867 A1 3/2021
SG 10201610155 Y 7/2018

(Continued)

OTHER PUBLICATIONS

Alistair Matthewson "The $2bn Question: Is PINless the Next Game Changer for CNP?" https://cmspi.com/nam/blogs/the-2bn-question-is-pinless-the-next-game-changer-for-cnp/, Feb. 1, 2018.

(Continued)

*Primary Examiner* — Chenyuh Kuo
(74) *Attorney, Agent, or Firm* — Bookoff McAndrews, PLLC (57) ABSTRACT

A computer-implemented method for processing single message transactions with batch settlement may include receiving a dual-message transaction from a merchant, converting the received dual-message transaction to a single-message transaction, setting a flag on the converted single-message transaction indicating the conversion to a single-message transaction, receiving a batch settlement file from the merchant, for each transaction in the batch settlement file, determining whether the single-message transaction conversion flag is set, upon determining that the single-message transaction conversion flag is not set, storing the transaction for later processing, and upon determining that the single-message transaction conversion flag is set, sending the transaction to a payment network.

18 Claims, 6 Drawing Sheets

(56) References Cited

U.S. PATENT DOCUMENTS

| | | | |
|---|---|---|---|
| 9,424,573 B2* | 8/2016 | von Mueller | G06Q 20/367 |
| 10,504,098 B2* | 12/2019 | Keresman, III | G06Q 20/26 |
| 10,769,601 B2* | 9/2020 | Subramanian | G06Q 20/023 |
| 2009/0043696 A1* | 2/2009 | Ornce | G06Q 20/10 |
| | | | 705/35 |
| 2011/0270665 A1* | 11/2011 | Kim | G06Q 30/0233 |
| | | | 705/14.33 |
| 2013/0254110 A1* | 9/2013 | Royyuru | G06Q 20/386 |
| | | | 705/44 |
| 2014/0101037 A1 | 4/2014 | Ornce et al. | |
| 2016/0217466 A1* | 7/2016 | Kennedy | G06Q 20/023 |
| 2021/0264423 A1* | 8/2021 | Rohlfing | G06Q 40/02 |
| 2021/0295295 A1* | 9/2021 | Sukhija | G06Q 20/027 |
| 2021/0398124 A1* | 12/2021 | Bhasin | G06Q 20/4014 |
| 2022/0318801 A1* | 10/2022 | Ferreira Da Silva | G06Q 20/40 |
| 2023/0274622 A1* | 8/2023 | Adams | G07F 9/002 |
| | | | 705/43 |

FOREIGN PATENT DOCUMENTS

| | | |
|---|---|---|
| WO | 2019074689 A1 | 4/2019 |
| WO | 2020209990 A1 | 10/2020 |

OTHER PUBLICATIONS

First Data, Pinless Transaction Clarifications, First Data Corporation, Apr. 2017 (Year: 2017).

* cited by examiner

SYSTEMS AND METHODS FOR SINGLE MESSAGE TRANSACTIONS WITH BATCH SETTLEMENT

CROSS-REFERENCE TO RELATED APPLICATION(S)

This patent application is a continuation of and claims the benefit of priority to U.S. Nonprovisional patent application Ser. No. 16/995,317, filed on Aug. 17, 2020, the entirety of which is incorporated herein by reference.

TECHNICAL FIELD

Various embodiments of the present disclosure relate generally to methods and systems for electronic transaction messaging. More particularly, the technologies described herein relate to the field of conversion and routing of distinct electronic transaction message types through one or more electronic transaction networks.

BACKGROUND

Transactions, including card transactions, are used for a great number of purchases and sales between merchants and cardholders. A normal card transaction can involve a number of parties, including an account holder who possesses a card, a merchant, an acquirer processor, an issuer processor, an issuer financial institution and a card association network. Millions of such transactions occur daily at merchants using a variety of payment vehicle types, such as credit cards, debit cards, prepaid cards, digital wallets, and so forth.

Depending on the type of payment vehicle used, the transaction may be processed by the involved parties by exchanging messages in accordance with an appropriate messaging scheme. For example, in a dual-message transaction, which primarily involves signature-based transactions including credit card transactions and signature-based debit card transactions, an electronic message containing the information required for an authorization decision may be submitted at the time of purchase, and a separate electronic message containing additional data required for clearing and settlement may be submitted at a later point in time. In a single-message transaction, which primarily involves debit card transactions including both personal identification number (PIN)-based and PIN-less debit card transactions, a single electronic message containing all data required for the authorization, clearing, and settlement of the transaction may be submitted at the time of purchase.

Under certain circumstances, the fees associated with the dual-message transaction may be higher compared to those associated with the single-message transaction. When a customer initiates a dual-message transaction (e.g., a credit card transaction, a signature-based debit card transaction), the issuer financial institution takes a risk by transferring the funds to the merchant and waiting to collect the funds from the consumer at a later date. The merchant may thus be subjected to a percentage fee charged by the issuer financial institution for taking such a risk and processing the transaction, in addition to the fees charged by other entities for the time and resources used to process the transaction. On the other hand, when a customer initiates a single-message transaction (e.g., a PIN-based or PIN-less debit card transaction), the customer authorizes funds to be transferred from her account to the merchant's account at the time of sale. Accordingly, routing and processing the single-message transaction (for example, in a debit network) may consume less resources, incur less fees, and may allow the merchant to realize cost-savings by routing transactions using alternative domestic networks.

The present disclosure is directed to overcoming one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the present disclosure, systems and methods are disclosed for processing single message transactions with batch settlement.

In one embodiment, a computer-implemented method is disclosed for processing single message transactions with batch settlement, the method comprising: receiving a dual-message transaction from a merchant, converting the received dual-message transaction to a single-message transaction, setting a flag on the converted single-message transaction indicating the conversion to a single-message transaction, receiving a batch settlement file from the merchant, for each transaction in the batch settlement file, determining whether the single-message transaction conversion flag is set, upon determining that the single-message transaction conversion flag is not set, storing the transaction for later processing, and upon determining that the single-message transaction conversion flag is set, sending the transaction to a payment network.

In accordance with another embodiment, a system is disclosed for processing single message transactions with batch settlement, the system comprising: a data storage device storing instructions for processing single message transactions with batch settlement in an electronic storage medium; and a processor configured to execute the instructions to perform a method including: receiving a dual-message transaction from a merchant, converting the received dual-message transaction to a single-message transaction, setting a flag on the converted single-message transaction indicating the conversion to a single-message transaction, receiving a batch settlement file from the merchant, for each transaction in the batch settlement file, determining whether the single-message transaction conversion flag is set, upon determining that the single-message transaction conversion flag is not set, storing the transaction for later processing, and upon determining that the single-message transaction conversion flag is set, sending the transaction to a payment network In accordance with another embodiment, a non-transitory machine-readable medium storing instructions that, when executed by the a computing system, causes the computing system to perform a method for processing single message transactions with batch settlement, the method including: receiving a dual-message transaction from a merchant, converting the received dual-message transaction to a single-message transaction, setting a flag on the converted single-message transaction indicating the conversion to a single-message transaction, receiving a batch settlement file from the merchant, for each transaction in the batch settlement file, determining whether the single-message transaction conversion flag is set, upon determining that the single-message transaction conversion flag is not set, storing the transaction for later processing, and upon determining that the single-message transaction conversion flag is set, sending the transaction to a payment network.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. As will be apparent from the embodiments below, an advantage to the disclosed systems and methods is that dual-message transactions may be processed as single-message transactions, including batch processing of transaction settlements at the end of the day. The disclosed systems and methods discussed below may allow reduced fees and processing costs for merchants and payment processors.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

The following embodiments describe methods and systems for electronic transaction messaging. More particularly, the technologies described herein relate to the field of conversion and routing of distinct electronic transaction message types.

The disclosed embodiments are directed to enabling a dual-message transaction to be converted to a single-message transaction and processed under a single-message scheme, and/or to be routed to a PIN-less debit network in order to reap the benefits of the debit network, including batch settlement of multiple transactions.

As discussed above, merchants may prefer single-message transactions over dual-message transactions, such as because of potential cost savings in leveraging an existing single message transaction framework and architecture for PIN-less dual message transactions. However, existing systems do not allow for the conversion of a dual message transaction, such as a PIN-less dual message transaction, to a single message transaction, such as a debit transaction.

Furthermore, merchants may have additional options to route their PIN-less transactions due to the number of alternative providers other than the traditionally dominant card brands in the market. Merchants may, thus, see approximately a 30% savings, in some cases, in interchange fees and low-fixed cost network fees. Providing such a batch settlement capability for single-message transactions in a conventional payment processing system would require establishing separate batch settlement feeds for each payment network. The cost to a payment processor of building the necessary infrastructure could be significant, thus reducing revenue from processing such transactions.

Thus, a need exists for seamlessly converting messages generated under the dual-message scheme to a message compliant with the single-message scheme, including batch processing of transaction settlements at the end of the day.

Various non-limiting embodiments of the present disclosure will now be described to provide an overall understanding of the principles of the structure, function, and use of systems and methods disclosed herein for electronic transaction messaging conversion. One or more examples of these non-limiting embodiments are illustrated in the selected examples disclosed and described in detail with reference made to FIGS. 1-5 in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

For simplicity, the description that follows will be provided by reference to a "payment vehicle," which generally refers to any type of financial alternative to currency. As is to be clear to those skilled in the art, no aspect of the present disclosure is specifically limited to a specific type of payment vehicle. Therefore, it is intended that the following description encompasses the use of the present disclosure with many other forms of financial alternatives to currency, including credit cards, debit cards, smart cards, single-use cards, pre-paid cards, electronic currency (such as might be provided through a cellular telephone or personal digital assistant), and the like. Payment vehicles can be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A payment vehicle can also have electronic functionality provided by a network of electronic circuitry that is printed or otherwise incorporated onto or within the payment vehicle (and typically referred to as a "smart card"), or be a fob having a transponder and an RFID reader.

Figure 1:
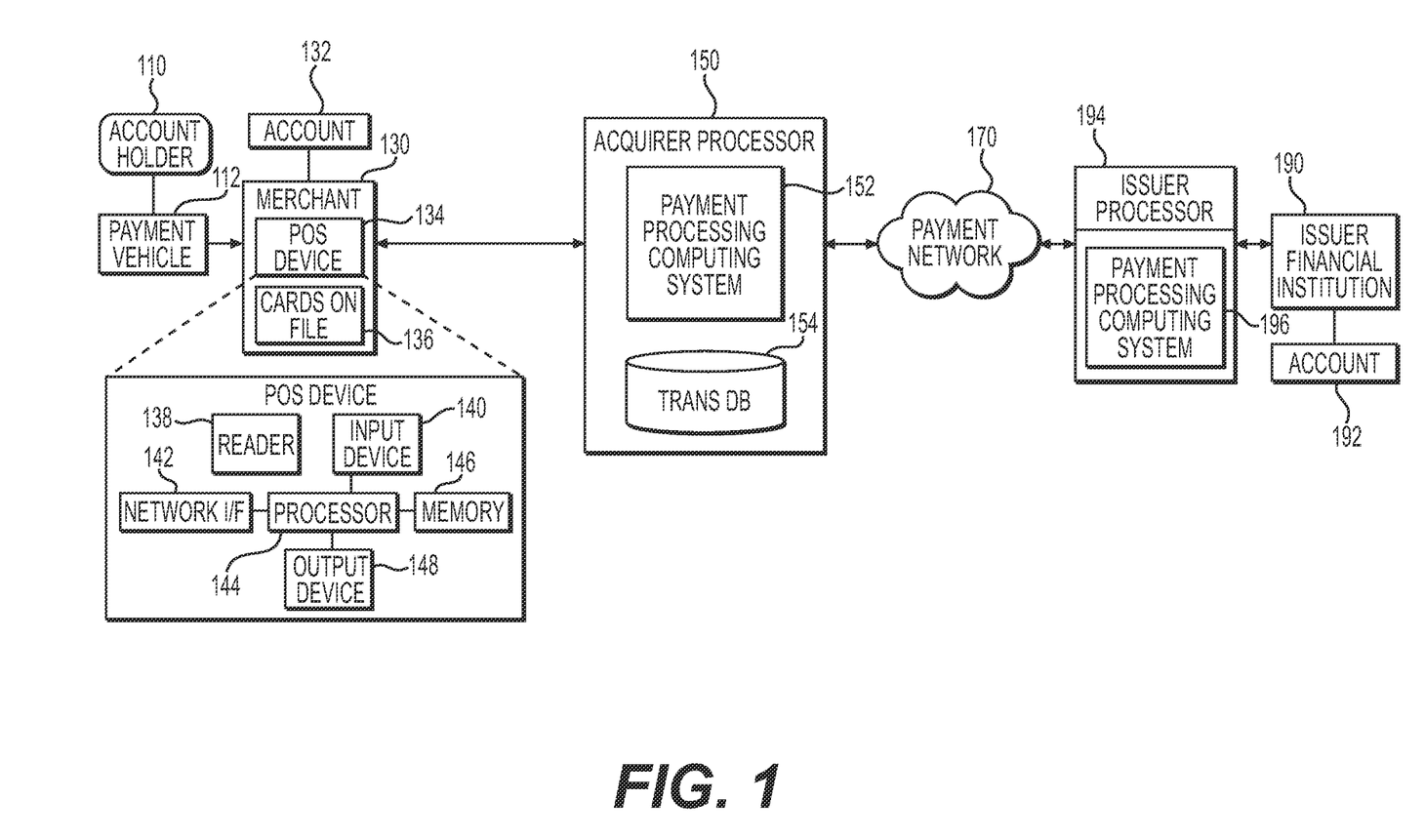
FIG. 1 depicts a block diagram of an exemplary payment system within a payment network, according to one or more embodiments.

Referring now to the appended drawings, FIG. 1 depicts a block diagram of an exemplary payment system, according to one aspect of the present disclosure. In the payment system 100, a payment vehicle 112 may be issued to an account holder 110 by an issuer financial institution 190. The issuer financial institution 190 may be any of a variety of financial institutions that is capable of issuing a payment vehicle to an account holder 110. The payment vehicle 112 may be used to pay a merchant 130 for a purchase transaction at a point of sale (POS) device 134. The POS device 134 may be any device that facilitates receipt of a payment vehicle for payment of a purchase, such as for example, a POS terminal or a web interface. Further, it is to be appreciated that the merchant 130 may be any type of merchant system or service provider system, such as a brick-and-mortar merchant system, an online merchant system (e.g., a merchant server, an electronic commerce (e-commerce) server, etc.), a mobile merchant system, a kiosk system, or any other type of merchant system or device configured to receive payment cards from account holders as a form of payment. Therefore, the merchant 130 may also be referred to as a merchant system 130 in the present disclosure.

The POS device 134 may be configured to interact with the payment vehicle 112 to obtain account information about a consumer account affiliated with the account holder 110. In one embodiment, the POS device 134 may include a memory 146 coupled to the processor 144, which controls the operations of a reader 138, an input device 140, an output device 148 and a network interface 142. The memory 146 may store instructions for the processor 144 and/or data, such as an identification that is associated with the merchant account 132.

In one embodiment, the reader 138 may include a magnetic strip reader. In another embodiment, the reader 138 may include a contactless reader, such as a radio frequency identification (RFID) reader, a near field communications (NFC) device configured to read data via magnetic field coupling (in accordance with ISO standard 14443/NFC), a Bluetooth transceiver, a Wi-Fi transceiver, an infrared transceiver, a laser scanner, and so forth.

In one embodiment, the input device 140 may include key buttons that can be used to enter the account information directly into the POS device 134 without the physical presence of the payment vehicle 112. The input device 140 may be configured to provide further information to initiate a transaction, such as a personal identification number (PIN), password, zip code, etc., or in combination with the account information obtained from the payment vehicle 112. In one embodiment, the output device 148 may include a display, a speaker, and/or a printer to present information, such as the result of an authorization request, a receipt for the transaction, an advertisement, and so forth.

In one embodiment, the network interface 142 may be configured to communicate with the acquirer processor 150 via a telephone connection, an Internet connection, or a dedicated data communication channel.

In one embodiment, the instructions stored in the memory 146 may be configured at least to cause the POS device 134 to send an authorization request message to the acquirer processor 150 to initiate a transaction. The POS device 134 may or may not send a separate request for the clearing and settling of the transaction.

For example, under a dual-message scheme, a separate request for the clearing and settling of the transaction may be generated and sent by the POS device 134 following the transmission of the authorization request message. The request for the clearing and settling of the transaction may be referred to as a capture message throughout this disclosure. A capture message may contain information needed by different entities of the payment system 100 to clear and settle the transaction. The dual-message scheme may be used to process signature-based transactions (e.g., credit card transactions and signature-based debit card transactions), and may sometimes be associated with higher fees compared to those of a single-message scheme, especially for transactions involving large purchases. The higher fees may be due to the higher risk involved with credit card transactions and/or more complex routing and processing of the messages under the dual-message scheme. Under a dual-message scheme, settlement message for multiple transactions may be collected and processed in batch at the end of the day. For example, a batch settlement file, or Electronic Merchant Deposit (EMD) file, including a record for each transaction, may be prepared by merchant 130 and sent to acquirer processor 150 at the end of the day, or on another appropriate schedule.

Under a single-message scheme on the other hand, a separate request may not be necessarily generated. Instead, a single payment processing request for both the authorization and capture (i.e., clearing and settlement) may be generated and sent by the POS device 134 at the time of sale. In other words, the authorization request message initially sent to the acquirer processor 150 may also contain information needed for clearing and settling of the transaction. The single-message scheme may be used to process PIN-based or PIN-less debit card transactions, and may provide access to debit networks. The account holder 110 may authorize funds to be transferred to the account 132 of the merchant 130 at the time of the payment transaction. Such a single payment processing request for both the authorization and capture may be referred to as a composite message throughout this disclosure. Under certain circumstances (e.g., large purchases), single-message transactions may incur lower fees compared to those of the dual-message transactions, given the lower risk and/or less rigorous routing and processing of the messages.

As alluded to above, signature-based transactions, for which a dual message scheme may be utilized, may include credit card transactions and signature-based debit card transactions. A signature-based debit card transaction may also be referred to as a signature-based debit transaction, an offline debit card transaction, an offline debit transaction, etc. A signature-based debit card transaction may work like a normal credit card transaction and may require a customer signature, not a PIN, which authorizes the merchant to collect appropriate funds from that customer's bank account, usually one to several days after the payment is made. A signature-based debit card transaction may use a credit card network rather than a debit network, and may utilize a dual message scheme as discussed above.

Debit card transactions, for which a single message scheme may be utilized, may include PIN-based and PIN-less debit card transactions. A PIN-based debit card transaction may require a customer to enter a PIN, which authorizes immediate withdrawal of funds from the customer's account. A PIN-less debit card transaction may allow a debit card transaction to be processed without requiring the customer to enter a PIN. For instance, a PIN-less debit card transactions may allow a customer to make a payment without providing a PIN, using the same debit card they otherwise would use at an automated teller machine (ATM) with a PIN, at a POS device with a signature or PIN, etc. Each individual merchant location may need to agree to participate in the PIN-less debit card transactions and to use POS devices certified for PIN-less debit card transactions. As alluded to above, these types of debit card transactions (i.e., PIN-based and PIN-less debit card transactions) may be routed to a debit network, for which a single message scheme may be utilized.

It should be noted that, although the present disclosure describes that the signature-based transactions may be processed under the dual message scheme and the PIN-based/PIN-less debit transactions may be processed under the single message scheme based on the current landscape of the payment processing technology, the message scheme used for the respective transaction types may not be limited in the manner explicitly described herein. In other words, the signature-based transactions could also be processed under the single message scheme, and the PIN-based/PIN-less debit transactions could also be processed under the dual message scheme, depending on the arrangements and configurations agreed to by the involved parties (e.g., merchants, acquirers, payment networks, issuers, etc.) on the message schemes used with respect to the respective transaction types. Therefore, the message conversion technique discussed in the present disclosure should be considered broadly as a way to convert a dual message to a single message, and should not be viewed in a limiting sense such as, for example, only to convert a message used in a credit transaction to a message used in a PIN-based or PIN-less debit transaction.

The messages exchanged between the entities in the payment network 100 may be in conformance with the ISO 8583 standard. ISO 8583 is an international standard for financial transaction payment vehicle originated interchange messaging, which defines a message format and a communication flow so that different entities can exchange the transaction requests and responses. In general, an ISO 8583 message may comprise three parts, including a message type indicator (MTI), one or more bitmaps, and one or more data elements. The MTI indicates the overall purpose and function of the message as well as the origin. The bitmaps indicate which data elements are present in the message. The data elements may be the individual fields carrying the transaction information.

It should be noted that, although the present disclosure describes the POS device 134 as the component that transmits messages to and receives messages from the acquirer processor 150, the merchant system 130 may also have other components configured to transmit, receive, and process messages. Therefore, it should be understood that the messages described in the present disclosure to be handled by the POS device 134 may also be handled by another component within the merchant system 130. Accordingly, it should be understood that the merchant system 130 in general may generate, process, transmit, and receive messages, and the message handling at the merchant system 130 may not be limited only to the POS device 134.

The instructions stored in the memory 146 may also be configured to cause the POS device 134 to perform other types of functions discussed in this description.

In one embodiment, a POS device 134 may have fewer components than those illustrated in FIG. 1. For example, in one embodiment, the POS device 134 may be configured for "card-not-present" transactions; and the POS device 134 may not have a reader 138. In one embodiment, a POS device 134 may have more components than those illustrated in FIG. 1.

During a purchase event, the POS device 134 may send an authorization request message for the purchase transaction to an acquirer processor 150 that processes payment vehicle transactions for the merchant 130. As is to be appreciated, additional intermediary entities, such as one or more payment gateways, may assist with the handling and routing of the authorization request message or other related messaging. For the purposes of illustration, such intermediary entities may be considered part of the acquirer processor 150. The authorization request message may include identifying information from the payment vehicle 112, such as a bank identification number (BIN), a primary account number (PAN), an expiration date, and a first and last name of the account holder 110, for example. The authorization request message may also include identifying information from the purchase such as a transaction amount and identifying information from the POS device 134 (e.g., a POS identifier) and/or the merchant 130 (e.g., a merchant identifier), for example.

In some embodiments, the payment vehicle 112 may be used to establish a recurring billing arrangement between the account holder 110 and the merchant 130. An initial transaction may allow the merchant 130 to store account information which can be used for subsequent billing events. The account information may be stored in the cards-on-file storage 136. For example, the purchase event illustrated in FIG. 1 may be associated with a subscription, membership plan, installment payment plan between the merchant 130 and the account holder 110. For subsequent transactions, the merchant 130 may access the cards-on-file storage 136 to retrieve the relevant account information. The subsequent transactions may not necessarily need direct involvement from the account holder 110. In other embodiments, the account holder 110 may trigger the subsequent transaction, but may not provide the payment vehicle 112 to the merchant 130, as the merchant 130 has access to the cardholder's account information in the cards-on-file storage 136.

A payment processing computing system 152 at the acquirer processor 150 may receive the authorization request message from the merchant 130. The payment processing computing system 152 may translate the authorization request message, if necessary, and can provide the authorization request message to a payment network 170. The payment network 170 may be, for example, a network of a credit or debit card association affiliated with the payment vehicle 112. Non-limiting examples of credit card associations include VISA, MASTERCARD, DISCOVER, AMERICAN EXPRESS, etc. and non-limiting examples of debit card associations include NYCE, STAR, ACCEL, INTERLINK, etc. The authorization request message may then be provided to a payment processing computing system 196 at an issuer processor 194. In response to receiving the authorization request message, and based on the type of payment vehicle 112, the payment processing computing system 196 may provide the authorization request message to the issuer financial institution 190. Using information from the authorization request message, the issuer financial institution 190 may associate the purchase transaction with an account 192 of the account holder 110 held by the issuer financial institution 190. The issuer financial institution 190 may then send an authorization response message which can either approve or deny the transaction. The authorization response message may be provided to the payment processing computing system 196 at the issuer processor 194 and then provided to the payment network 170. The authorization response message may then be provided to the payment processing computing system 152 at the acquirer processor 150. Upon receiving the authorization response message, the payment processing computing system 152 may send either an approval message or a denial message to the POS device 134 to complete the purchase transaction. If the purchase transaction is approved, it may be posted to the account holder's account 192 and reconciled later with the account holder 110 and the merchant 130. As alluded to above, under a dual-message scheme, the POS device 134 (i.e., the merchant 130) may initiate the clearing (including reconciling) and settlement phase by sending a capture message to the acquirer processor 150.

Transaction records may be stored in one or more locations within the system 100. In one embodiment, the transaction records may be stored within a transaction data database 154 of the acquirer processor 150. The transaction data forming the transaction records may be received by the transaction data database 154 from various sources, such as the POS device 134, the merchant 130, the acquirer processor 150, and so on. A plurality of transaction parameters associated with the purchase transaction may be stored in each transaction record which can generally be used for settlement and financial recordkeeping. While the transaction parameters stored in each transaction record can vary, example transaction parameters may include, without limitation, an account number, a card number, payment vehicle information, product information (such as product type, product serial number, and so forth), a transaction amount, loyalty account information, merchant information, a transaction amount, a response code, a transaction date, a transaction time, whether the transaction was a "card present" transaction, and so on.

As alluded to above, transactions being processed under a dual-message scheme may sometimes incur higher fees for the merchants. If the POS device 134 of a merchant 130 is solely configured for the dual-message scheme, the merchant 130 may need to update/re-code the POS device 134 or replace the POS device 134 with an updated version, in order to process transactions using a single-message scheme. In some cases, it can be cumbersome for merchants to update or replace the POS device 134 when there is a constant flow of transactions to be processed by the device 134. By using the technique discussed in the current disclosure, merchants will be able to retain the dual-message setup of the POS devices 134 and still reap the benefits of the single-message scheme without necessarily making any modifications to the existing dual-message setup. More specifically, the merchants will be able to access debit networks and reduce transaction-associated costs without having to upgrade or replace the POS devices 134 for the single-message capability.

Figure 2:
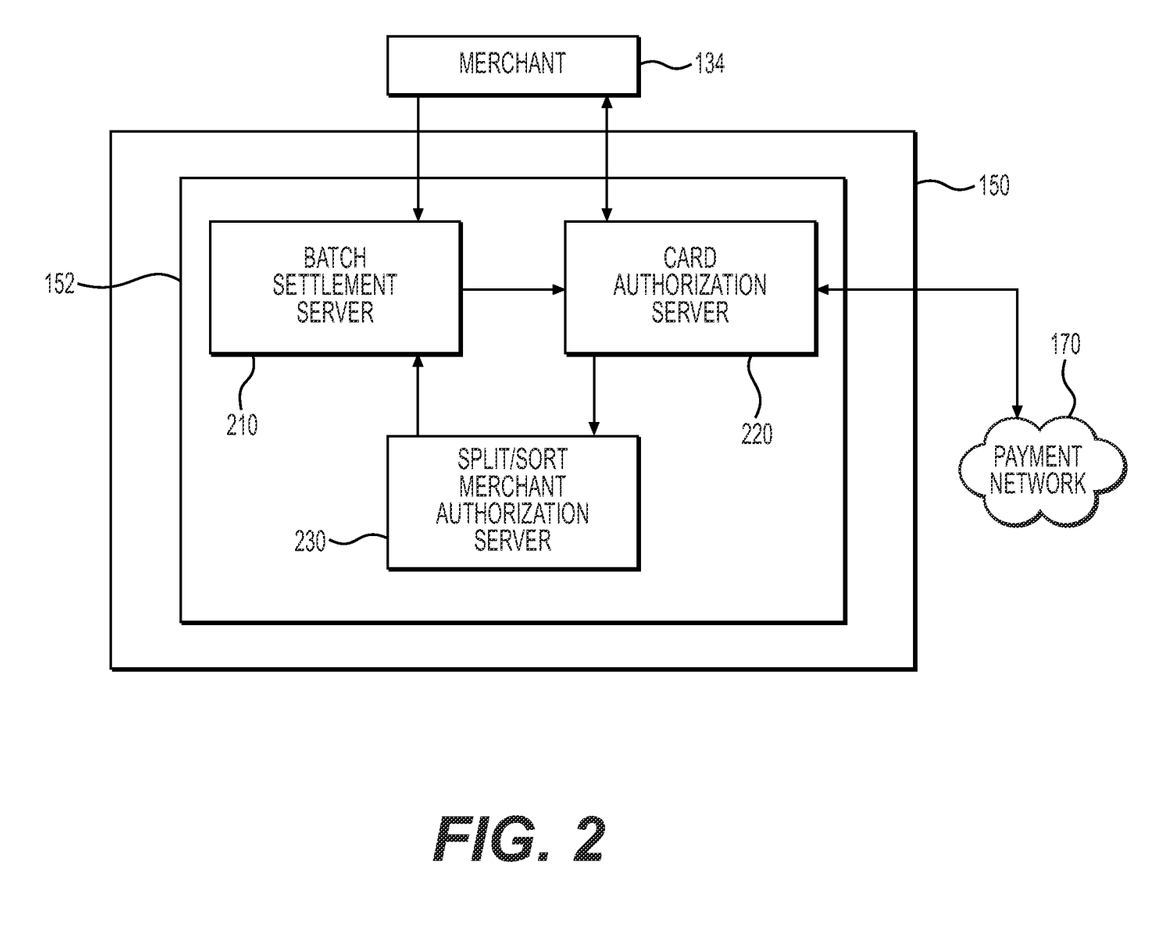
FIG. 2 depicts a block diagram of an exemplary payment system, according to one or more embodiments.

FIG. 2 depicts a block diagram of an exemplary payment system, according to one or more embodiments. As shown in FIG. 2, payment processing computing system 152 of acquirer processor 150 according to one or more embodiments may include a batch settlement server 210, a card authorization server 220, and a merchant authorization server 230. Card authorization server 220 may be a reliable automated funds transfer (RAFT) server. Prior to settlement of a transaction, card authorization server 220 may perform pre-authorization of payment transactions, may convert the transaction to a single-message transaction, such as a PIN-less debit transaction, and may set a flag on the transaction indicating the conversion. The conversion step may be performed by card authorization server 220 for single-message transactions, such as, for example, PIN-based debit card transactions or PIN-less credit card transactions. Batch settlement server 210 may receive a batch settlement file including multiple payment transactions from merchant 134 on a pre-determined schedule, such as, for example, at the end of the day, may determine which transactions were converted to a PIN-less debit transaction, and may send the converted transactions to card authorization server 220 individually. Card authorization server 220 may receive payment transactions from batch settlement server 210 and interface with payment network 170 to process the transactions. Card authorization server 220 may make use of existing batch processing capabilities to improve efficiency transaction processing.

Figure 3A:
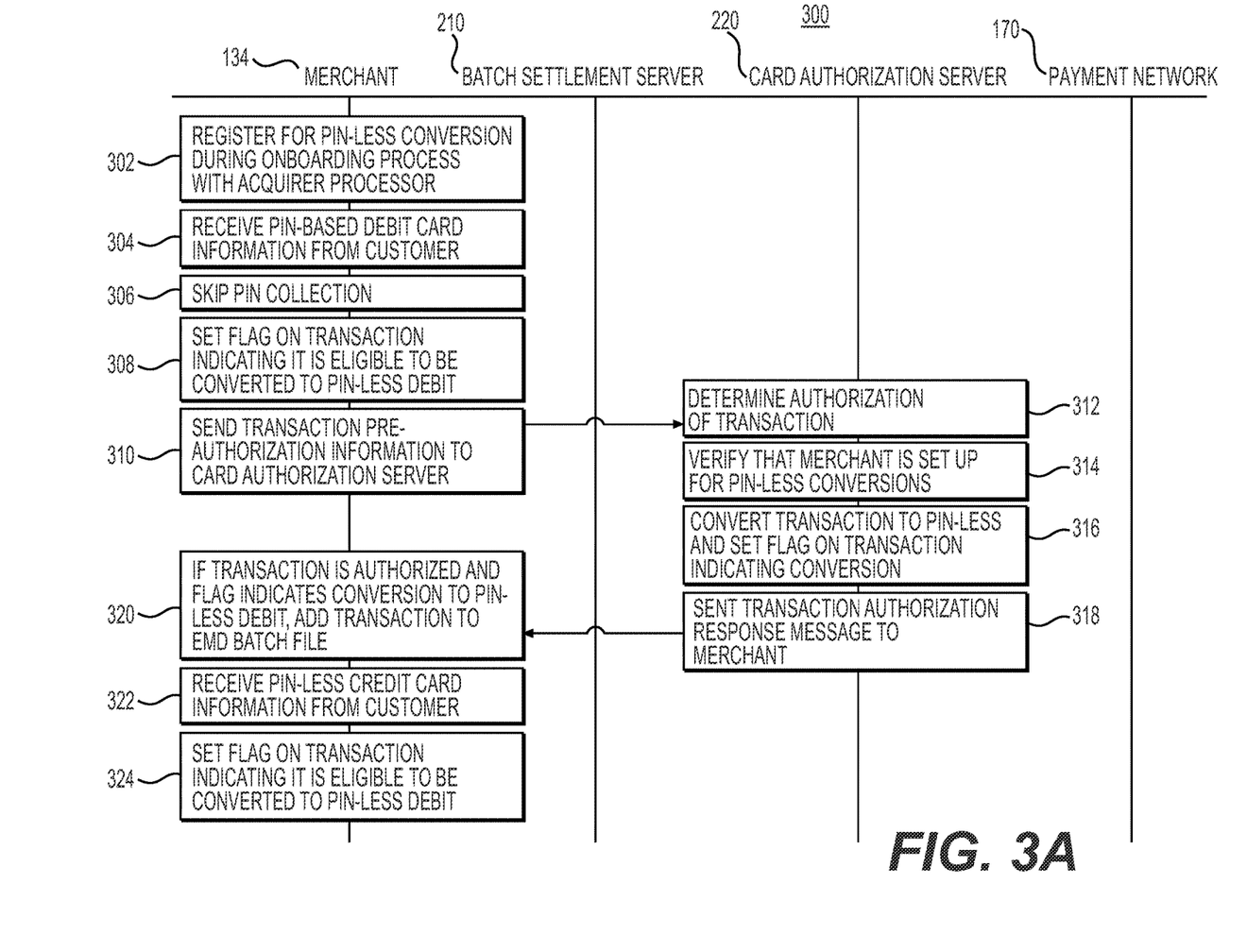
FIGS. 3A-3B depict a message flow diagram in a method of single message transactions with batch settlement, according to one or more embodiments.
Figure 3B:
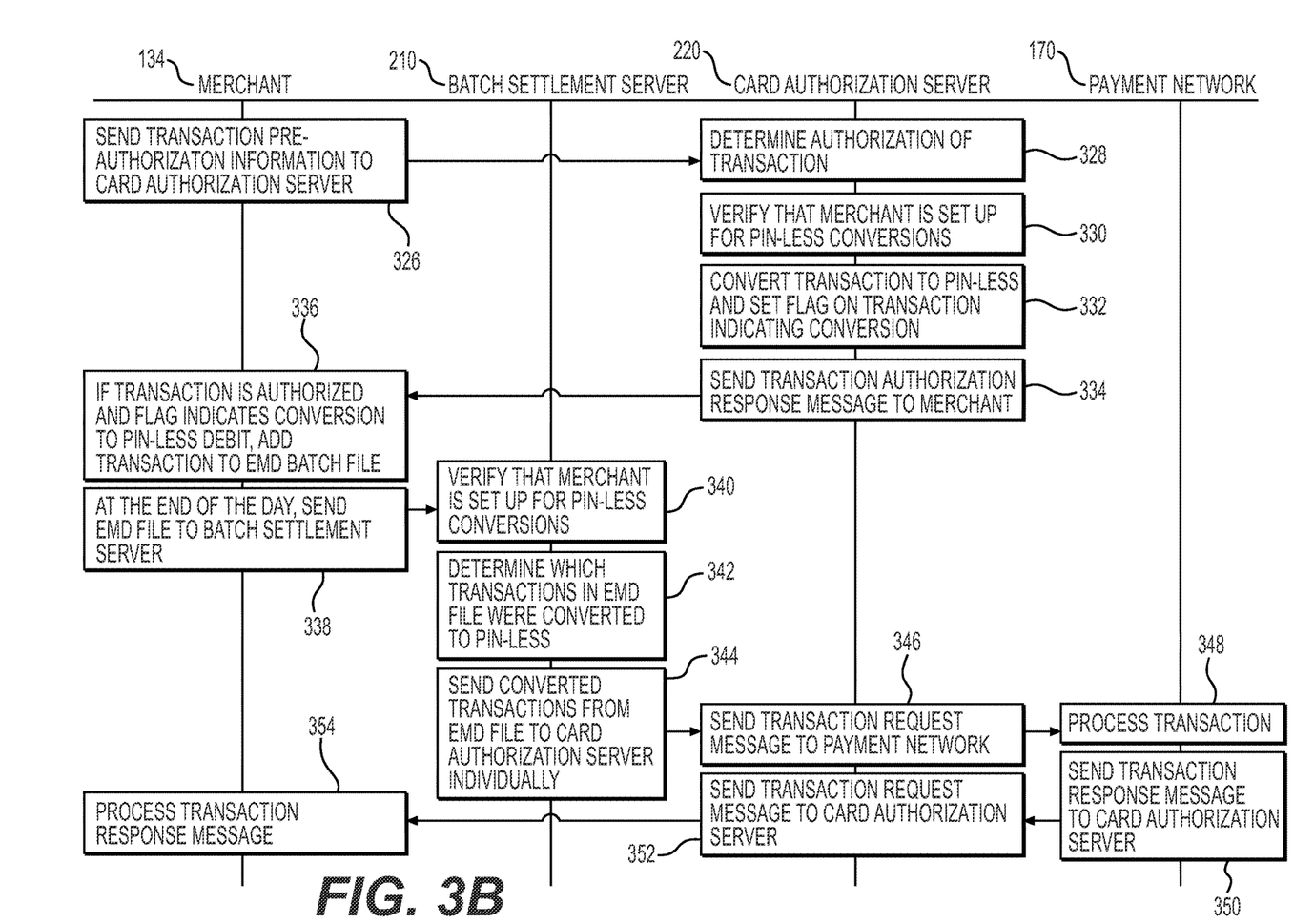

FIGS. 3A-3B depict a message flow diagram in a method of single message transactions with batch settlement, according to one or more embodiments. In operation 302, the merchant may register for the conversion of transactions to PIN-less debit transactions during an onboarding process with an acquirer processor. In operation 304, the merchant may receive PIN-based debit card information from customer. In operation 306, the merchant may skip collection of the customer's PIN. In operation 308, the merchant may set a flag on the transaction indicating it is eligible to be converted to a PIN-less debit transaction. In operation 310, the merchant may send pre-authorization information for the transaction to the card authorization server. In operation 312, the card authorization server may determine an authorization status of the transaction. In operation 314, the card authorization server may verify that the merchant is set up for PIN-less conversions. In operation 316, the card authorization server may convert the transaction to a PIN-less debit transaction and may set a flag on the transaction indicating that the transaction was converted. In operation 318, the card authorization server may send a transaction authorization response message to the merchant. In operation 320, the merchant may, if the transaction is authorized and a flag indicates conversion to PIN-less debit, the merchant may add the transaction to a batch settlement file (EMD file). In operation 322, the merchant may receive PIN-less credit card information from the customer. In operation 324, the merchant may set a flag on the transaction indicating that it is eligible to be converted to PIN-less debit. In operation 326, the merchant may send transaction pre-authorization information to the card authorization server. In operation 328, the card authorization server may determine an authorization status of the transaction. In operation 330, the card authorization server may verify that the merchant is set up for conversion of transactions to PIN-less debit. In operation 332, the card authorization server may convert the transaction to PIN-less debit and may set a flag on the transaction indicating the conversion. In operation 334, the card authorization server may send a transaction authorization response message to the merchant. In operation 336, the merchant may, if the transaction is authorized and the flag indicates conversion of the transaction to PIN-less debit, add the transaction to a batch settlement file (EMD file). In operation 338, the merchant may, at the end of the day, send the batch settlement file to a batch settlement server. In operation 340, the batch settlement server may verify that the merchant is set up for conversion of transactions to PIN-less debit. In operation 342, the batch settlement server may determine which transactions in the batch settlement file were converted to PIN-less debit. In operation 344, the batch settlement server may send the converted transactions from the batch settlement file to the card authorization server individually. In operation 346, the card authorization server may send a transaction request message to a payment network. In operation 348, the payment network may process the transaction. In operation 350, the payment network may send a transaction response message to the card authorization server. In operation 352, the card authorization server may send the transaction response message to the card authorization server. In one or more embodiments, the card authorization server may send the transaction response message to the batch settlement server, which may collect the response messages in a batch response file to be sent to the merchant at a later time, such as, for example, after the completion of all transactions from the batch settlement file, at a predetermined time, or periodically during processing of the batch settlement file. In operation 354, the merchant may process the transaction response message.

Figure 4:
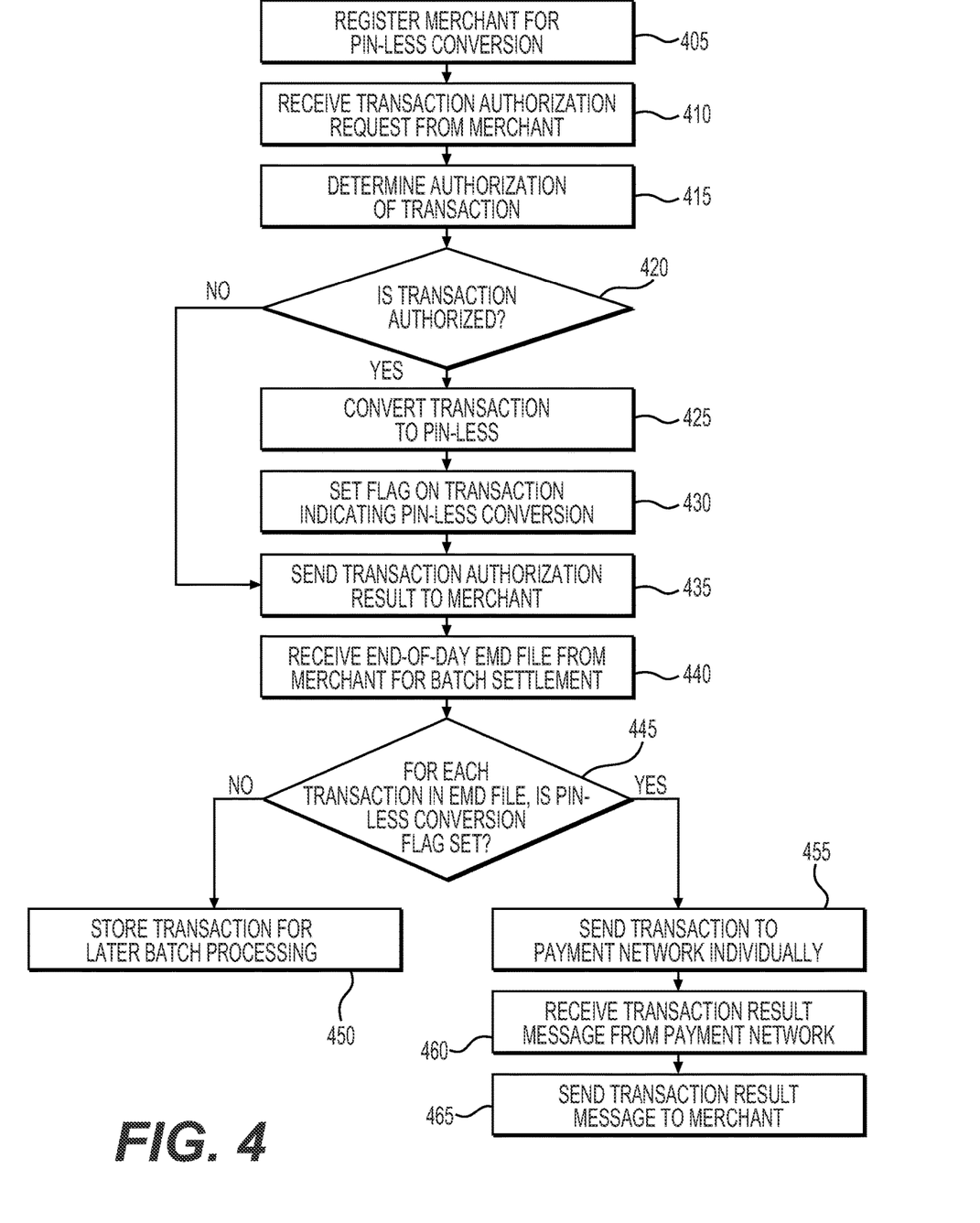
FIG. 4 depicts a flowchart of a method of single message transactions with batch settlement, according to one or more embodiments.

FIG. 4 depicts a flowchart of a method of single message transactions with batch settlement, according to one or more embodiments. As shown in FIG. 4, in operation 405, the payment processing computing system may register a merchant for PIN-less conversion. In operation 410, the payment processing computing system may receive a transaction authorization request from the merchant. In operation 415, the payment processing computing system may determine an authorization status of the transaction. In operation 420, the payment processing computing system may determine whether the transaction is authorized. If the transaction is not authorized then the payment processing computing system may resume with operation 435. If the transaction is authorized then, in operation 425, the payment processing computing system may convert the transaction to a PIN-less transaction. In operation 430, the payment processing computing system may set a flag on the transaction indicating conversion of the transaction to a PIN-less transaction. In operation 435, the payment processing computing system may send a transaction authorization result to the merchant. In operation 440, the payment processing computing system may receive an end-of-day batch settlement file from the merchant for batch settlement of earlier authorized transaction requests. In operation 445, the payment processing computing system may, for each transaction in the batch settlement file, determine whether the PIN-less conversion flag is set. If the PIN-less conversion flag is not set then in operation 450, the payment processing computing system may store the transaction for later batch processing. If the PIN-less conversion flag is set, then in operation 455, the payment processing computing system may send transaction to a payment network individually, receive a transaction result message from the payment network. In operation 460, and, in operation 465, send the transaction result message to the merchant.

By using the technique discussed above, merchants will be able to retain the dual-message setup of existing POS devices and still reap the benefits of a single-message scheme without necessarily making any modifications to the existing dual-message setup. More specifically, the merchants will be able to access debit networks and reduce transaction-associated costs without having to upgrade or replace existing POS devices for the single-message capability.

Unless specifically stated otherwise, as apparent from the following discussions, it is appreciated that throughout the specification discussions utilizing terms such as "processing," "computing," "calculating," "determining", "analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

Figure 5:
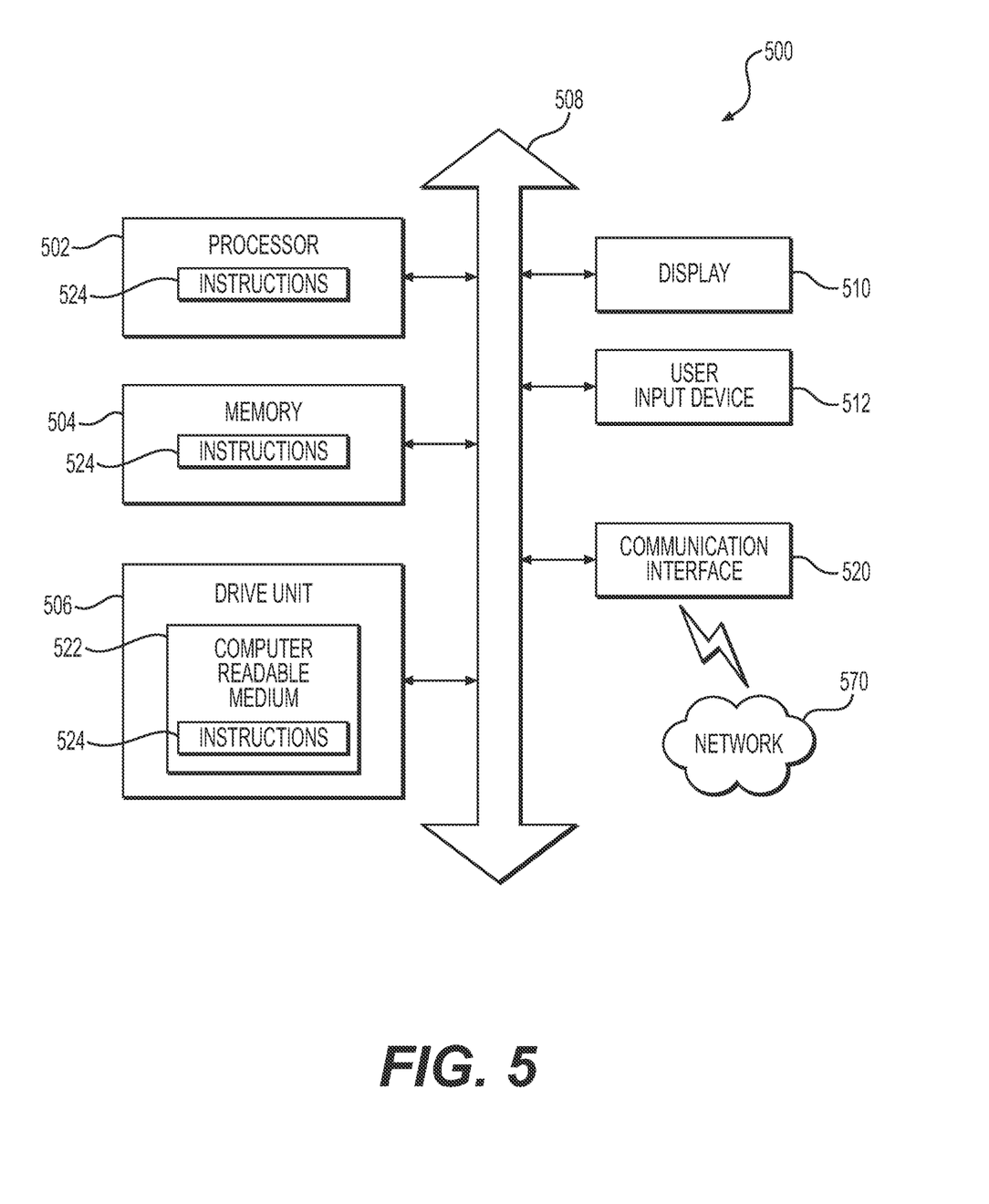
FIG. 5 illustrates an implementation of a computer system that may execute techniques presented herein.

FIG. 5 illustrates an implementation of a general computer system designated 500. The computer system 500 can include a set of instructions that can be executed to cause the computer system 500 to perform any one or more of the methods or computer based functions disclosed herein. The computer system 500 may operate as a standalone device or may be connected, e.g., using a network, to other computer systems or peripheral devices.

In a networked deployment, the computer system 500 may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 500 can be implemented using electronic devices that provide voice, video, or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics processing unit (GPU), or both. The processor 502 may be a component in a variety of systems. For example, the processor 502 may be part of a standard personal computer or a workstation. The processor 502 may be one or more general processors, digital signal processors, application specific integrated circuits, field programmable gate arrays, servers, networks, digital circuits, analog circuits, combinations thereof, or other now known or later developed devices for analyzing and processing data. The processor 502 may implement a software program, such as code generated manually (i.e., programmed).

The computer system 500 may include a memory 504 that can communicate via a bus 508. The memory 504 may be a main memory, a static memory, or a dynamic memory. The memory 504 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 504 includes a cache or random-access memory for the processor 502. In alternative implementations, the memory 504 is separate from the processor 502, such as a cache memory of a processor, the system memory, or other memory. The memory 504 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 504 is operable to store instructions executable by the processor 502. The functions, acts or tasks illustrated in the figures or described herein may be performed by the programmed processor 502 executing the instructions stored in the memory 504. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 500 may further include a display unit 510, such as a liquid crystal display (LCD), an organic light emitting diode (OLED), a flat panel display, a solid-state display, a cathode ray tube (CRT), a projector, a printer or other now known or later developed display device for outputting determined information. The display 510 may act as an interface for the user to see the functioning of the processor 502, or specifically as an interface with the software stored in the memory 504 or in the drive unit 506.

Additionally or alternatively, the computer system 500 may include an input device 512 configured to allow a user to interact with any of the components of system 500. The input device 512 may be a number pad, a keyboard, or a cursor control device, such as a mouse, or a joystick, touch screen display, remote control, or any other device operative to interact with the computer system 500.

The computer system 500 may also or alternatively include a disk or optical drive unit 506. The disk drive unit 506 may include a computer-readable medium 522 in which one or more sets of instructions 524, e.g. software, can be embedded. Further, the instructions 524 may embody one or more of the methods or logic as described herein. The instructions 524 may reside completely or partially within the memory 504 and/or within the processor 502 during execution by the computer system 500. The memory 504 and the processor 502 also may include computer-readable media as discussed above.

In some systems, a computer-readable medium 522 includes instructions 524 or receives and executes instructions 524 responsive to a propagated signal so that a device connected to a network 570 can communicate voice, video, audio, images, or any other data over the network 570. Further, the instructions 524 may be transmitted or received over the network 570 via a communication port or interface 520, and/or using a bus 508. The communication port or interface 520 may be a part of the processor 502 or may be a separate component. The communication port 520 may be created in software or may be a physical connection in hardware. The communication port 520 may be configured to connect with a network 570, external media, the display 510, or any other components in system 500, or combinations thereof. The connection with the network 570 may be a physical connection, such as a wired Ethernet connection or may be established wirelessly as discussed below. Likewise, the additional connections with other components of the system 500 may be physical connections or may be established wirelessly. The network 570 may alternatively be directly connected to the bus 508.

While the computer-readable medium 522 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 522 may be non-transitory, and may be tangible.

The computer-readable medium 522 can include a solid-state memory such as a memory card or other package that houses one or more non-volatile read-only memories. The computer-readable medium 522 can be a random-access memory or other volatile re-writable memory. Additionally or alternatively, the computer-readable medium 522 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 500 may be connected to one or more networks 570. The network 570 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 570 may include wide area networks (WAN), such as the Internet, local area networks (LAN), campus area networks, metropolitan area networks, a direct connection such as through a Universal Serial Bus (USB) port, or any other networks that may allow for data communication. The network 570 may be configured to couple one computing device to another computing device to enable communication of data between the devices. The network 570 may generally be enabled to employ any form of machine-readable media for communicating information from one device to another. The network 570 may include communication methods by which information may travel between computing devices. The network 570 may be divided into sub-networks. The sub-networks may allow access to all of the other components connected thereto or the sub-networks may restrict access between the components. The network 570 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures, and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method for processing single-message transactions with batch settlement by a payment system, the method comprising:
   receiving, by the payment system, a transaction authorization request comprising a dual-message payment transaction from a merchant system, wherein the transaction authorization request comprises information that the dual-message payment transaction is eligible to be converted to a single-message payment transaction, wherein another dual-message payment transaction that is not eligible for conversion of dual-message transactions to single-message transactions is to be processed by a first payment network using a dual-message transaction scheme;
   verifying, by the payment system, that the merchant system is registered for the conversion of dual-message transactions to single-message transactions;
   generating, by the payment system, the single-message payment transaction using the dual-message payment transaction, wherein generating the single-message payment transaction comprises:
      converting, by the payment system, the dual-message payment transaction to the single-message payment transaction using a single-message transaction scheme, wherein the converted single-message payment transaction is to be processed by a second payment network using the single-message transaction scheme and as a personal identification numberless (PIN-less) debit transaction;
   setting, by the payment system, a single-message transaction conversion flag on the converted single-message payment transaction, wherein the single-message transaction conversion flag indicates the converted single-message payment transaction is a converted dual-message payment transaction;
   in response to receiving the transaction authorization request, transmitting, by the payment system to the merchant system, a transaction authorization response, wherein the transaction authorization response comprises data associated with the converted single-message payment transaction and the single-message transaction conversion flag;
   receiving, by the payment system, a single-message transaction batch settlement file from the merchant system, wherein the single-message transaction batch settlement file comprises a plurality of single-message payment transactions;
   determining, by the payment system, that the single-message transaction conversion flag is set-on a first single-message payment transaction of the plurality of single-message payment transactions;
   based on determining that the single-message transaction conversion flag is set on the first single-message payment transaction of the plurality of single-message payment transactions, transmitting, by the payment system, the first single-message payment transaction of the plurality of single-message payment transactions to the second payment network;
   receiving, by the payment system, a transaction result message of the first single-message payment transaction from the second payment network; and
   transmitting, by the payment system, the transaction result message of the first single-message payment transaction to the merchant system.

2. The computer-implemented method of claim 1, further comprising:
   registering, by the payment system, the merchant system for the conversion of dual-message transactions to single-message transactions during an onboarding process of the merchant system to the payment system.

3. The computer-implemented method of claim 1, wherein prior to the converting, the method further comprises:
   determining, by the payment system, that the received dual-message payment transaction is authorized; and
   based on determining that the received dual message transaction is authorized, transmitting, by the payment system, a transaction authorization result message of the received dual-message payment transaction to the merchant system.

4. The computer-implemented method of claim 1, further comprising:
   determining, by the payment system, that the single-message transaction conversion flag is not set on a second single-message payment transaction of the plurality of single-message payment transactions; and
   storing, by the payment system, the second single-message payment transaction for later processing.

5. The computer-implemented method of claim 1, wherein the single-message transaction batch settlement file is received from the merchant system at a predetermined time.

6. The computer-implemented method of claim 1, wherein the received dual-message payment transaction is a chip-based credit card transaction received without a personal identification number (PIN).

7. A payment system for processing single-message transactions with batch settlement, the payment system comprising:
 a processor; and
 a computer-readable medium storing instructions that, when executed by the processor, cause the processor to perform steps of:
  receiving a transaction authorization request comprising a dual-message payment transaction from a merchant system, wherein the transaction authorization request comprises information that the dual-message payment transaction is eligible to be converted to a single-message payment transaction, wherein another dual-message payment transaction that is not eligible for conversion of dual-message transactions to single-message transactions is to be processed by a first payment network using a dual-message transaction scheme;
  verifying that the merchant system is registered for the conversion of dual-message transactions to single-message transactions;
  generating the single-message payment transaction using the dual-message payment transaction, wherein generating the single-message payment transaction comprises:
   converting the dual-message payment transaction to the single-message payment transaction using a single-message transaction scheme, wherein the converted single-message payment transaction is to be processed by a second payment network using the single-message transaction scheme and as a personal identification number-less (PINless) debit transaction;
   setting a single-message transaction conversion flag on the converted single-message payment transaction, wherein the single-message transaction conversion flag indicates that the converted single-message payment transaction is a converted dual-message payment transaction;
  in response to receiving the transaction authorization request, transmitting, to the merchant system, a transaction authorization response, wherein the transaction authorization response comprises data associated with the converted single-message payment transaction and the single-message transaction conversion flag;
  receiving a single-message transaction batch settlement file from the merchant system, wherein the single-message transaction batch settlement file comprises a plurality of single-message payment transactions;
  determining that the single-message transaction conversion flag is set on a first single-message payment transaction of the plurality of single-message payment transactions;
  based on determining that the single-message transaction conversion flag is set on the first single-message payment transaction of the plurality of single-message payment transactions, transmitting the first single-message payment transaction of the plurality of single-message payment transactions to the second payment network;
  receiving a transaction result message of the first single-message payment transaction from the second payment network; and
  transmitting the transaction result message of the first single-message payment transaction to the merchant system.

8. The payment system of claim 7, wherein the computer-readable medium storing instructions that, when executed by the processor, further cause the processor to perform additional steps of:
 registering the merchant system for the conversion of dual-message transactions to single-message transactions during an onboarding process of the merchant system to the payment system.

9. The payment system of claim 7, wherein, prior to the converting, the computer-readable medium storing instructions that, when executed by the processor, further cause the processor to perform additional steps of include:
 determining that the received dual-message payment transaction is authorized; and
 based on determining that the received dual message transaction is authorized, transmitting a transaction authorization result message of the received dual-message payment transaction to the merchant system.

10. The payment system of claim 7, wherein the computer-readable medium storing instructions that, when executed by the processor, further cause the processor to perform additional steps of:
 determining that the single-message transaction conversion flag is not set on a second single-message payment transaction of the plurality of single-message payment transactions; and
 storing, by the payment system, the second single-message payment transaction for later processing.

11. The payment system of claim 7, wherein the single-message transaction batch settlement file is received from the merchant system at a predetermined time.

12. The payment system of claim 7, wherein the dual-message payment transaction is a chip-based credit card transaction received without a personal identification number (PIN).

13. A non-transitory machine-readable medium storing instructions that, when executed by a processor of a payment system, cause the processor of the payment system to perform a method for processing single-message transactions with batch settlement, the method comprising:
 receiving a transaction authorization request comprising a dual-message payment transaction from a merchant system, wherein the transaction authorization request comprises information that the dual-message payment transaction is eligible to be converted to a single-message payment transaction, wherein another dual-message payment transaction that is not eligible for conversion of dual-message transactions to single-message transactions is to be processed by a first payment network using a dual-message transaction scheme;
 verifying that the merchant system is registered for the conversion of dual-message transactions to single-message transactions;
 generating the single-message payment transaction using the dual-message payment transaction, wherein generating the single-message payment transaction comprises:
  converting the dual-message payment transaction to the single-message payment transaction using a single-message transaction scheme, wherein the converted single-message payment transaction is to be processed by a second payment network using the single-message transaction scheme and as a personal identification number-less (PINless) debit transaction;

setting a single-message transaction conversion flag on the converted single-message payment transaction, wherein the single-message transaction conversion flag indicates that the converted single-message payment transaction is a converted dual-message payment transaction;

in response to receiving the transaction authorization request, transmitting, to the merchant system a transaction authorization response, wherein the transaction authorization response comprises data associated with the converted single-message payment transaction and the single-message transaction conversion flag;

receiving a single-message transaction batch settlement file from the merchant system, wherein the single-message transaction batch settlement file comprises a plurality of single-message payment transactions;

determining that the single-message transaction conversion flag is set on a first single-message payment transaction of the plurality of single-message payment transactions;

based on determining that the single-message transaction conversion flag is set on the first single-message payment transaction of the plurality of single-message payment transactions, transmitting the first single-message payment transaction of the plurality of single-message payment transactions to the second payment network;

receiving a transaction result message of the first single-message payment transaction from the second payment network; and transmitting the transaction result message of the first single-message payment transaction to the merchant system.

14. The non-transitory machine-readable medium of claim 13, wherein the instructions that, when executed by a processor of the payment system, cause the processor of the payment system to perform an additional step of:

registering the merchant system for the conversion of dual-message transactions to single-message transactions during an onboarding process of the merchant system to the payment system.

15. The non-transitory machine-readable medium of claim 13, wherein the instructions that, when executed by a processor of the payment system, cause the processor of the payment system to perform additional steps of:

determining that the received dual-message payment transaction is authorized; and based on determining that the received dual message transaction is authorized, transmitting a transaction authorization result message of the received dual-message payment transaction to the merchant system.

16. The non-transitory machine-readable medium of claim 13, wherein the instructions that, when executed by a processor of the payment system, cause the processor of the payment system to perform additional steps of:

determining that the single-message transaction conversion flag is not set on a second single-message payment transaction of the plurality of single-message payment transactions; and storing, by the payment system, the second single-message payment transaction for later processing.

17. The non-transitory machine-readable medium of claim 13, wherein the single-message transaction batch settlement file is received from the merchant system at a predetermined time.

18. The non-transitory machine-readable medium of claim 13, wherein the dual-message payment transaction is a chip-based credit card transaction received without a personal identification number (PIN).

* * * * *

UNITED STATES PATENT AND TRADEMARK OFFICE
CERTIFICATE OF CORRECTION

| | | |
|---|---|---|
| PATENT NO. | : 12,118,551 B2 | Page 1 of 1 |
| APPLICATION NO. | : 18/061144 | |
| DATED | : October 15, 2024 | |
| INVENTOR(S) | : Ramesh Vijayaraghavan and Samuel Adams | |

It is certified that error appears in the above-identified patent and that said Letters Patent is hereby corrected as shown below:

In the Claims

-In Column 20, Line 15, Claim 9, delete "steps of include:" and insert --steps of:--.

-In Column 21, Line 11, Claim 13, delete "system" and insert --system,--.

Signed and Sealed this
Twenty-sixth Day of November, 2024

Katherine Kelly Vidal
*Director of the United States Patent and Trademark Office*